United States Patent
Fredinburg et al.

(10) Patent No.: US 9,659,179 B1
(45) Date of Patent: May 23, 2017

(54) ACCESS CONTROL

(71) Applicants: Dan Fredinburg, Mountain View, CA (US); Paulo Schlup Santos, Belo Horizonte (BR)

(72) Inventors: Dan Fredinburg, Mountain View, CA (US); Paulo Schlup Santos, Belo Horizonte (BR)

(73) Assignee: Google Inc., Mountain View, CA (US)

(*) Notice: Subject to any disclaimer, the term of this patent is extended or adjusted under 35 U.S.C. 154(b) by 362 days.

(21) Appl. No.: 13/730,404

(22) Filed: Dec. 28, 2012

(51) Int. Cl.
*G06F 21/62* (2013.01)
*H04L 29/06* (2006.01)
*G06F 21/60* (2013.01)

(52) U.S. Cl.
CPC ............ *G06F 21/62* (2013.01); *H04L 63/108* (2013.01); *G06F 21/60* (2013.01); *G06F 2221/2137* (2013.01); *H04L 29/06823* (2013.01); *H04L 63/10* (2013.01)

(58) Field of Classification Search
CPC . H04L 63/108; H04L 29/06823; H04L 63/10; G06F 21/62; G06F 21/60; G06F 2221/2137
See application file for complete search history.

(56) References Cited

U.S. PATENT DOCUMENTS

2008/0313703 A1* 12/2008 Flaks et al. .................... 726/2
2012/0144457 A1*  6/2012 Counterman ................ 726/5

OTHER PUBLICATIONS

Chronopoulos et al., "Resource Access Control in Social Networks" Aug. 2012, pp. 142 http://ct-rsa2011.di.uoa.gr/CRYPTO.SEC/Theses_files/sdi0700002_sdi0700073.pdf.*
Stackoverflow et al., "Do FaceBook Oauth 2.0 Access Tokens Expire" Aug. 23, 2012, http://web.archive.org/web/20120823101420/http://stackoverflow.com/questions/2687770/do-facebook-oauth-2-0-access-tokens-expire.*
Chronopoulos et al., "Resource Access Control in Social Networks" Aug. 2012, pp. 142 http://ct-rsa2011.di.uoa.gr/CRYPTO.SEC/Theses_files/sdi0700002_sdi0700073.pdf.*
Wuest et al., "The Risks of Social Networking", Symantec, 2010, pp. 1-32 http://www.symantec.com/content/en/us/enterprise/media/security_response/whitepapers/the_risks_of_social_networking.pdf.*
MeetMe et al., "MeetMe Terms and Conditions", Jun. 2012, pp. 1-6 http://www.meetme.com/apps/terms.*
Stackoverflow et al., "Do FaceBook Oauth 2.0 Access Tokens Expire" Aug. 23, 2012, http://web.archive.org/web/20120823101420/http://stackoverflow.com/questions/2687770/do-facebook-oauth-2-O-access-tokens-expire.*
HubSpot et al., "HubSpot Developers", Jan. 6, 2012, pp. 1-2, http://web.archive.org/web/20120110020128/http://developers.hubspot.com/auth/oauth_apps.*
OSXDaily, "Disable Automatic Termination of Apps in Mac OS X Lion & Mountain Lion", May 2012, http://osxdaily.com/2012/05/15/disable-automatic-termination-of-apps-in-mac-os-x/.*

* cited by examiner

*Primary Examiner* — Jung Kim
*Assistant Examiner* — Carlos M De Jesus Lassala
(74) *Attorney, Agent, or Firm* — Patent Law Works LLP (57) ABSTRACT

A method and computing system for receiving, on a computing device, an access request from an application executing within an operating environment. The access request requests access to data associated with the operating environment. One or more temporal access options are presented to a user in response to the access request. A selected temporal access option is received from the user, chosen from the one or more temporal access options. Temporal access rights are granted to the application based, at least in part, upon the selected temporal access option.

20 Claims, 4 Drawing Sheets

ACCESS CONTROL

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

The phrase social network may be used to refer to a group of technologies (e.g., Web-based and mobile technologies) that allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

Additionally, social networks may let its users play web-based, multi-player applications with one or more of their friends within the social network. When installing these applications within the social network, such applications may need access to certain information (e.g., e-mail addresses, friend lists, demographic information) in order for the application to be enabled.

SUMMARY OF DISCLOSURE

In one implementation, a computer-implemented method includes receiving, on a computing device, an access request from an application executing within an operating environment. The access request requests access to data associated with the operating environment. One or more temporal access options are presented to a user in response to the access request. A selected temporal access option is received from the user, chosen from the one or more temporal access options. Temporal access rights are granted to the application based, at least in part, upon the selected temporal access option. The selected temporal access option defines an access time period. A temporal access rights expiration reminder is provided to the user prior to the expiry of the access time period. An extension request is received from the user in response to the temporal access rights expiration reminder, requesting an extension of the access time period. A temporal access rights extension is granted based upon the extension request from the user.

In another implementation, a computer-implemented method includes receiving, on a computing device, an access request from an application executing within an operating environment. The access request requests access to data associated with the operating environment. One or more temporal access options are presented to a user in response to the access request. A selected temporal access option is received from the user, chosen from the one or more temporal access options. Temporal access rights are granted to the application based, at least in part, upon the selected temporal access option.

One or more of the following features may be included. The one or more temporal access options may define one or more access levels for the data associated with the operating environment.

The selected temporal access option may define an access time period. The temporal access rights may be revoked after the expiry of the access time period. A temporal access rights expiration reminder may be provided to the user prior to the expiry of the access time period. An extension request may be received from the user in response to the temporal access rights expiration reminder, requesting an extension of the access time period. A temporal access rights extension may be granted based upon the extension request from the user. The temporal access rights may be prematurely revoked in response to a revocation request made by the user.

The selected temporal access option may define an access inactivity period. The temporal access rights may be revoked if the user fails to use the application for the access inactivity period. The operating environment may be a social networking environment. The application may be a gaming application that is configured to execute within the social networking environment.

In another implementation, a computing system including a processor and memory is configured to perform operations including receiving, on a computing device, an access request from an application executing within an operating environment. The access request requests access to data associated with the operating environment. One or more temporal access options are presented to a user in response to the access request. A selected temporal access option is received from the user, chosen from the one or more temporal access options. Temporal access rights are granted to the application based, at least in part, upon the selected temporal access option.

One or more of the following features may be included. The one or more temporal access options may define one or more access levels for the data associated with the operating environment.

The selected temporal access option may define an access time period. The temporal access rights may be revoked after the expiry of the access time period. A temporal access rights expiration reminder may be provided to the user prior to the expiry of the access time period. An extension request may be received from the user in response to the temporal access rights expiration reminder, requesting an extension of the access time period. A temporal access rights extension may be granted based upon the extension request from the user. The temporal access rights may be prematurely revoked in response to a revocation request made by the user.

The selected temporal access option may define an access inactivity period. The temporal access rights may be revoked if the user fails to use the application for the access inactivity period. The operating environment may be a social networking environment. The application may be a gaming application that is configured to execute within the social networking environment These and other aspects of this disclosure may provide one or more advantages, examples of which may include but are not limited to: automatically revoking temporal access rights after a defined period of time; and preventing applications from obtaining access rights in perpetuity that never expire.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE IMPLEMENTATIONS

Figure 1:
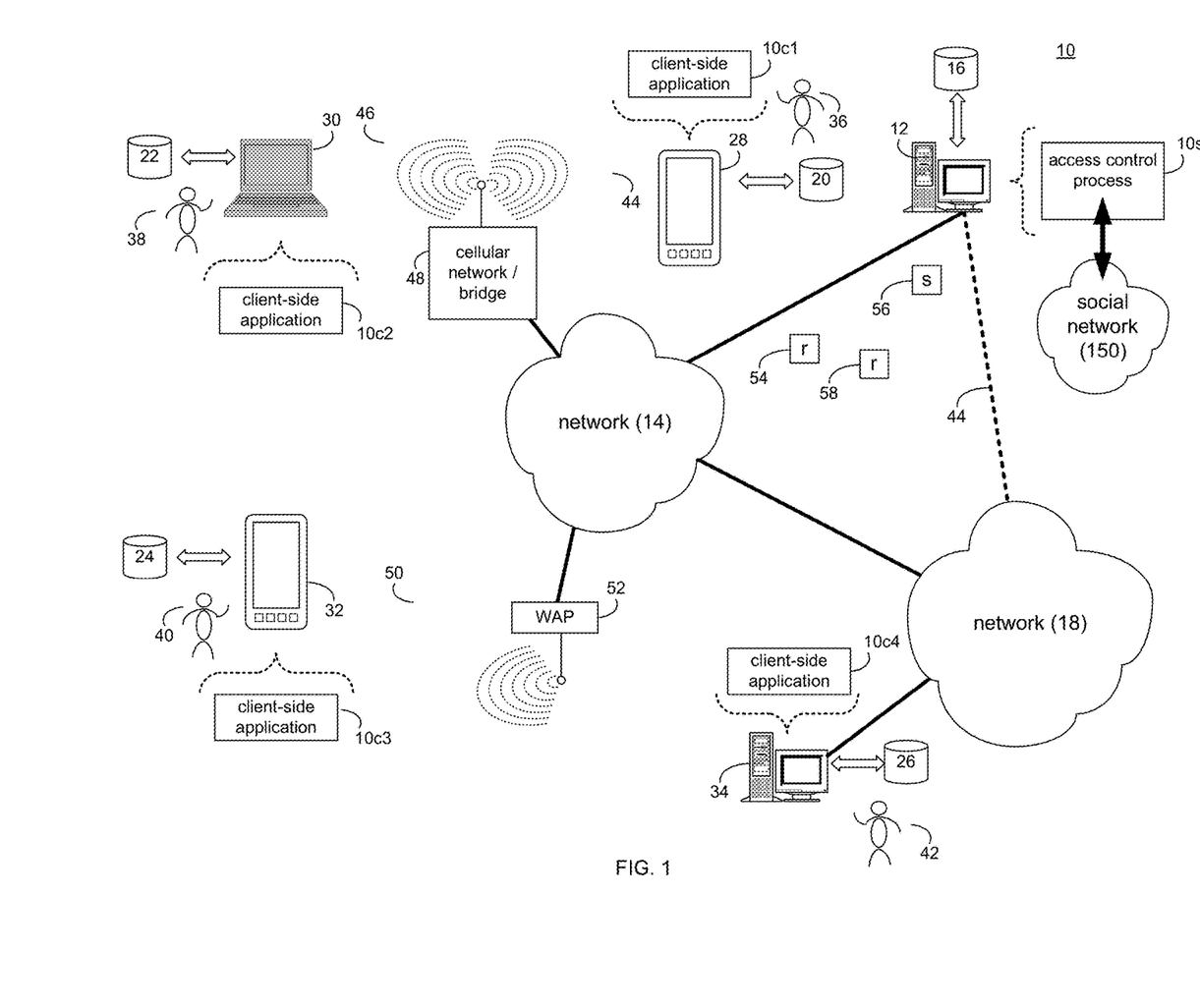
FIG. 1 is a diagrammatic view of a distributed computing network including a computing device that executes an access control process according to an implementation of the present disclosure.
Figure 2:
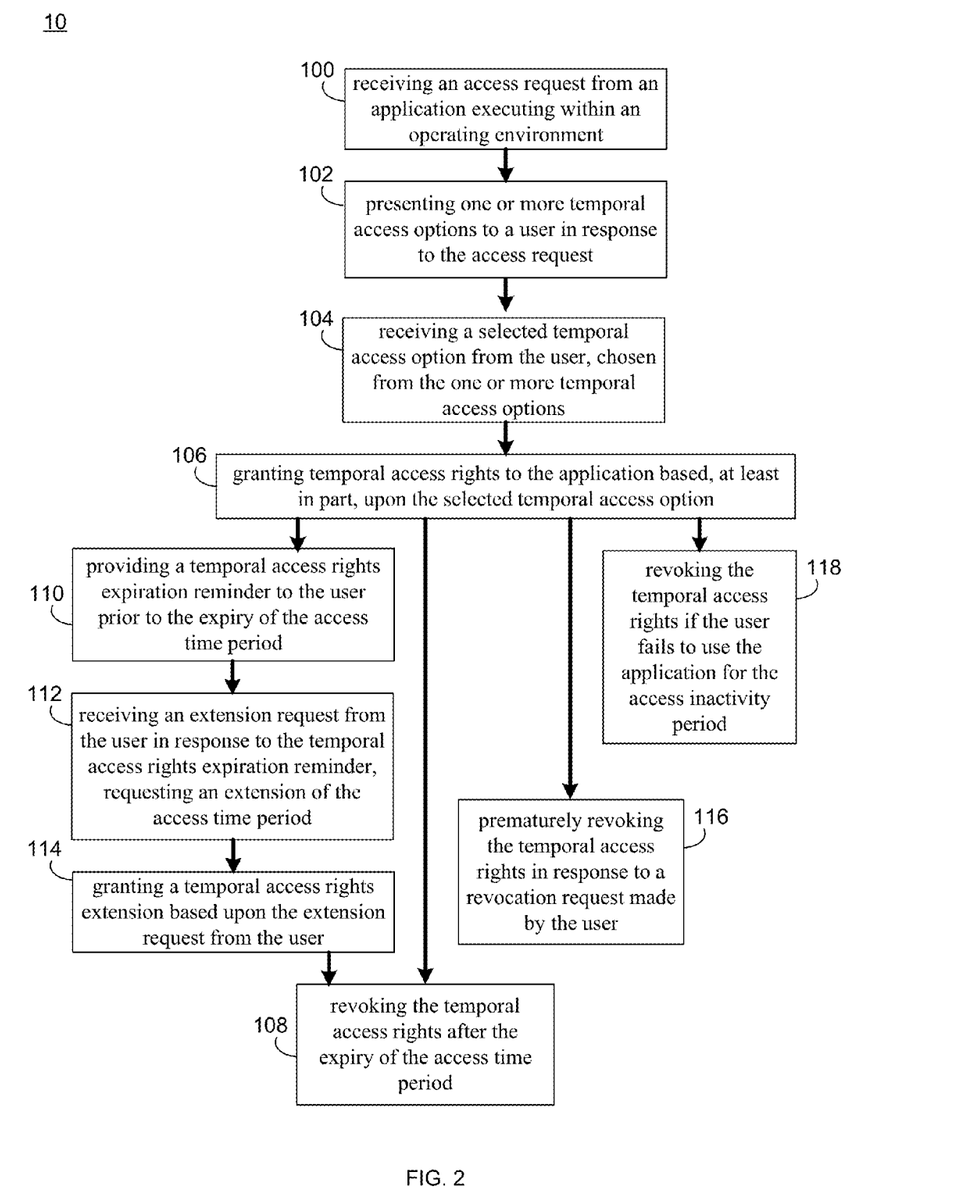
FIG. 2 is a flowchart of the access control process of FIG. 1 according to an implementation of the present disclosure.

In FIGS. 1 & 2, there is shown access control process 10. Access control process 10 may be implemented as a server-side process, a client-side process, or a hybrid server-side/client-side process. For example, access control process 10 may be implemented as a purely server-side process via access control process 10s. Alternatively, access control process 10 may be implemented as a purely client-side process via one or more of client-side application 10c1, client-side application 10c2, client-side application 10c3, and client-side application 10c4. Alternatively still, access control process 10 may be implemented as a hybrid server-side/client-side process via access control process 10s in combination with one or more of client-side application 10c1, client-side application 10c2, client-side application 10c3, and client- side application 10c4. Accordingly, access control process 10 as used in this disclosure may include any combination of access control process 10s, client-side application 10c1, client-side application 10c2, client-side application 10c3, and client-side application 10c4.

As will be discussed below in greater detail, access control process 10 may receive 100 an access request from an application executing within an operating environment. The access request may request access to data associated with the operating environment. One or more of temporal access options may be presented 102 to a user in response to the access request. A selected temporal access option may be received 104 from the user, chosen from the one or more temporal access options. Temporal access rights may be granted 106 to the application based, at least in part, upon the selected temporal access option.

Access control process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of access control process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application. The instruction sets and subroutines of client-side applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system.

Users 36, 38, 40, 42 may utilize access control process 10 directly through network 14 or through secondary network 18. Further, access control process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. The IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows, e.g., mobile phones, computers, and personal digital assistants to be interconnected using a short-range wireless connection.

Social networks may be configured to allow users to play web-based, multi-player online games with one or more of their friends within the social network.

While the following discussion is directed toward a gaming application that is being executed within a social networking environment, this is for illustrative purposes only and is not intended to be a limitation of this disclosure, as other configurations are possible and are considered to be within the scope of this disclosure and the related claims. For example, instead of a social networking environment, other operating environments may be utilized, such as an operating system or another application (e.g., a database application) being executed on a computing device. Further, instead of a gaming application, other applications may be utilized, such as a photograph processing application that requests access to photographs stored within a computing device.

Figure 3:
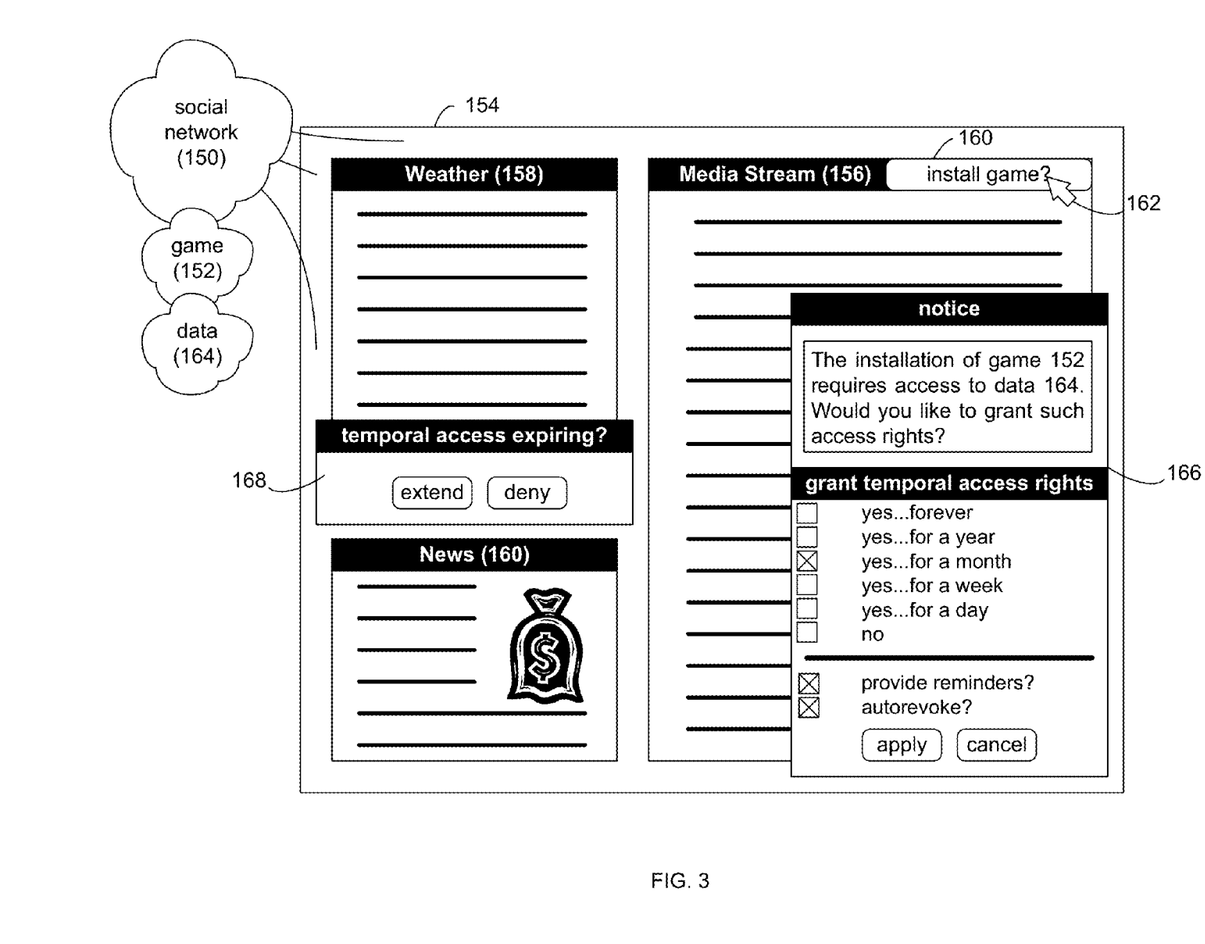
FIG. 3 is a diagrammatic view of a display screen rendered by the access control process of FIG. 1 according to an implementation of the present disclosure.

Referring also to FIG. 3, access control process 10 may be included within, executed within, or a portion of a social network (e.g., social network 150). As discussed above, social network 150 may be configured to provide users (e.g., users 36, 38, 40, 42) of social network 150 with the ability to play games (e.g., gaming application 152) within social network 150. Social network 150 may include graphical user interface 154, which may be divided into a plurality of sections, such as, e.g., media stream 156, weather 158 and news 160. Assume for illustrative purposes that user 36 (i.e. Mark) would like to play gaming application 152 within social network 150. Accordingly, user 36 may select, e.g., install game button 160 using onscreen pointer 162 (which is controllable via a mouse, not shown).

Upon user 36 selecting install game button 160, access request 54 may be generated by, e.g., gaming application 152, which may be provided to access control process 10. As discussed above, when installing games within, e.g., social network 150, such games often need access to certain information (e.g., e-mail addresses, friend lists, demographic information; collectively referred to as data 164) in order for play of the game to be enabled.

Access control process 10 may receive 100 access request 54 from gaming application 152 executing within an operating environment (e.g., social network 150), wherein access request 54 may request access to data 164 associated with the operating environment (e.g., social network 150).

Accordingly and in response to receiving 100 access request 54, access control process 10 may render access control window 166 that may allow user 36 to select the level/type of temporal access rights that user 36 wishes to grant to gaming application 152. Via access control window 166 and in response to access request 54, access control process 10 may present 102 one or more temporal access options to user 36.

In this particular example, access control window 166 is shown to include six temporal access options, namely: "yes . . . forever;" "yes . . . for a year;" "yes . . . for a month;" "yes . . . for a week;" "yes . . . for a day;" and "no." Accordingly, the first five of the six temporal access options grant gaming application 152 with temporal access rights for a finite period of time, wherein, after the expiry of such finite period of time, such temporal access rights may be automatically revoked. Further, the last temporal access option presented within access control window 166 does not grant temporal access rights to gaming application 152. Accordingly, the temporal access options included within access control window 166 may define one or more access levels for data 164 associated with the operating environment (e.g., social network 150).

Accordingly and through access control window 166, user 36 may select one of the six temporal access options, thus defining selected temporal access option 56. For example, assume that user 36 wishes to provide gaming application 152 with temporal access rights that will be automatically revoked after, e.g., one month. Accordingly, user 36 may select the third option (namely "yes . . . for a month") using onscreen pointer 162.

Upon processing temporal access option 56, access control process 10 may grant 106 temporal access rights to gaming application 152 based, at least in part, upon selected temporal access option 56. Accordingly and continuing with the above-stated example, access control process 10 may grant 106 gaming application 152 with temporal access rights that allow gaming application 152 to access data 164 for one month.

Since selected temporal access option 54 defines an access time period (e.g., one month), access control process 10 may be configured to revoke 108 the temporal access rights granted to gaming application 152 after the expiry of this access time period. Accordingly, after the passage of one month, access control process 10 may automatically revoke 108 the temporal access rights that user 36 granted to gaming application 152. Therefore and through the use of access control process 10, applications (such as gaming application 152) do not automatically obtain access rights in perpetuity that never expire.

Further, user 36 may select to have such rights never expire (e.g., by selecting the "yes . . . forever" option included within access control window 166). Conversely, user 36 may select to deny such rights (e.g., by selecting the "no" option included within access control window 166.

Access control process 10 may be configured to provide 110 a temporal access rights expiration reminder to user 36 prior to the expiry of the access time period. For example, access control process 10 may include within access control window 166 a user-selectable option in which access control process 10 provides 110 temporal access rights expiration reminders to user 36. Specifically, user 36 may select the "provide reminders?" option included within access control window 166, which may result in user 36 being provided with temporal access rights expiration reminder 168. Through temporal access rights expiration reminder 168, user 36 may select (using onscreen pointer 162) "extend" button 170, which may result in the generation of extension request 58. Access control process 10 may receive 112 extension request 58 (requesting an extension of the access time period) from user 36 in response to user 36 selecting the "extend" button included within temporal access rights expiration reminder 168; and may grant 114 a temporal access rights extension based upon extension request 58 from user 36. Depending upon how access control process 10 is configured, the length of the temporal access rights extension may be the defined period of time (e.g., equivalent to the original access time period). Alternatively, access control process 10 may be configured to allow user 36 to define the length of the temporal access rights extension. In the event that user 36 did not wish to extend the temporal access rights granted to gaming application 152, user 36 may select the "deny" button included within temporal access rights expiration reminder 168.

Assume for illustrative purposes that upon user 36 installing gaming application 152 and using the same, user 36 realizes that they do not like gaming application 152. Accordingly, access control process 10 may prematurely revoke 116 the temporal access rights granted by user 36 to gaming application 152 in response to a revocation request made by user 36. Specifically, through a configuration window (not shown) for gaming application 152, access control process 10 may allow user 36 to prematurely revoke 116 the temporal access rights granted by user 36 to gaming application 152, without having to wait for the expiration of the defined period of time.

Access control process 10 may define an access inactivity period for selected temporal access option 56. For example, access control process 10 may be configured to define an access inactivity period that is equivalent to, e.g., 25% of the defined period of time. Accordingly, if selected temporal access option 56 identifies the defined period of time as one year, access control process 10 may define an access inactivity period of three months for selected temporal access option 56. Accordingly, access control process 10 may revoke 118 the temporal access rights granted to gaming application 152 in the event that user 36 fails to use gaming application 152 for the access inactivity period. Specifically, and in this example, in the event that user 36 fails to use gaming application 152 for three months, it is likely that user 36 has stopped using gaming application 152. Accordingly, access control process 10 may revoke 118 the temporal access rights granted to gaming application 152, without having to wait for the expiration of the defined period of time (namely one year).

Alternatively, access control process 10 may define an access inactivity period as one or more stand-alone options. For example, access control process 10 may grant temporal access rights that continue in perpetuity unless, e.g., gaming application 152 is not used: for a year; for a month; for a week; or for a day; at which point the temporal access rights granted to gaming application 152 would be revoked.

While access control process 10 is described above as allowing user 36 to define the temporal access rights granted to an application when first installing the application or renewing the temporal access rights of the application, this is for illustrative purposes only and is not intended to be a limitation of this disclosure, as other configuration are possible. For example, access control process 10 may be configured to allow, e.g., user 36 to define and/or change the temporal access rights granted to an application by user 36 at any time.

While access control process 10 is described above as allowing user 36 to specify temporal access rights granted to an application on a per application basis, this is for illustrative purposes only and is not intended to be a limitation of this disclosure, as other configurations are possible. For example, access control process 10 may be configured so that temporal access rights are assigned on a global basis, wherein an access rights default configuration is established and applied to all applications being installed (unless the default configuration is overridden).

While the temporal rights are defined above as being solely defined based upon a defined access period or a defined inactivity period, other configurations are possible and are considered to be within the scope of this disclosure. For example, when temporal access rights are granted for an application, a certificate (not shown) may be generated that defines the temporal access rights for that application, wherein these certificates have defined expiration periods. Accordingly, when the application is being accessed, the associated certificate may be obtained and, if still valid, access rights may be granted to the application. However, if the certificate has expired, access rights may not be granted to the application.

Alternatively, temporal access rights may be granted to specific applications by controlling the capability of the application to penetrate firewalls (e.g., included within a router or an operating system). For example, when temporal access rights are granted for an application, the application may be granted access through the firewall for a defined period of time. After the expiry of such a defined period of time, firewall access may be revoked and, therefore, the application will no longer be able to function properly.

Figure 4:
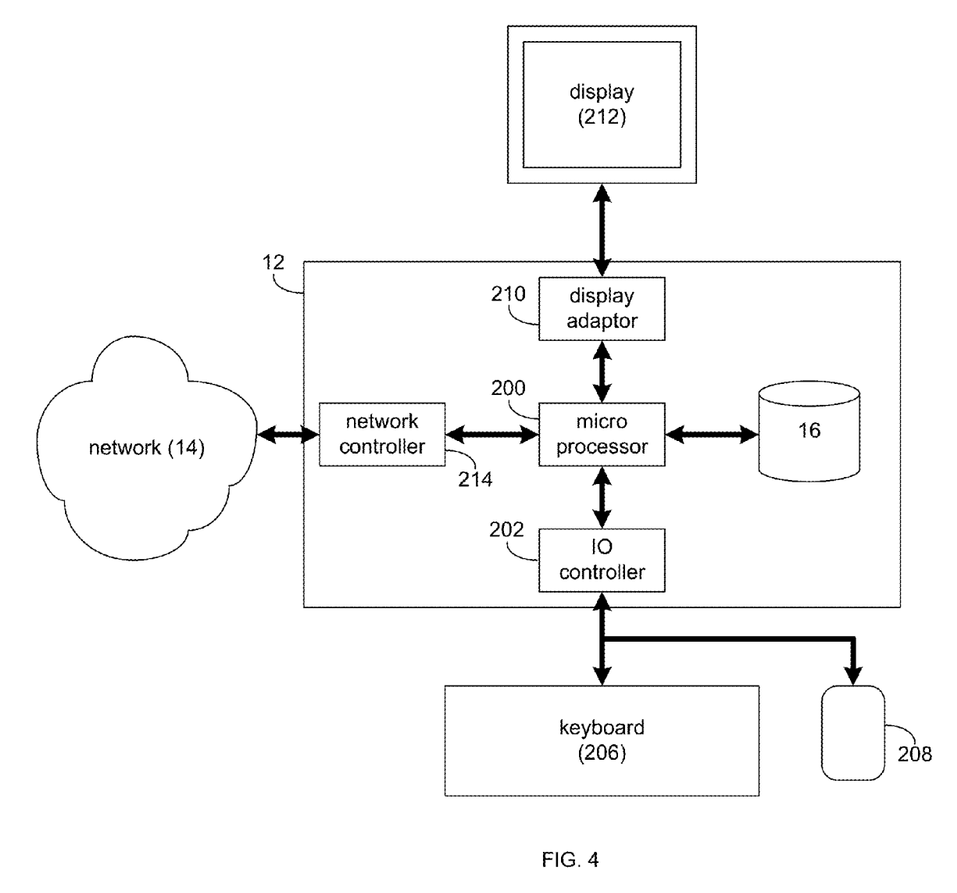
FIG. 4 is a diagrammatic view of the computing device of FIG. 1 according to an implementation of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, access control process 10 may be substituted for computing device 12 within FIG. 4, examples of which may include but are not limited to client electronic devices 28, 30, 32, 34.

Computing system 12 may include microprocessor 200 configured to, e.g., process data and execute instructions/code for access control process 10. Microprocessor 200 may be coupled to storage device 16. As discussed above, examples of storage device 16 may include but are not limited to: a hard disk drive; a tape drive; an optical drive; a RAID device; an NAS device; a Storage Area Network; a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

The present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent without departing from the scope and spirit of the disclosure. The implementation was chosen and described in order to best explain the principles of the disclosure and the practical application, and to enable others to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   receiving, on a computing device, an access request from an application executing within an operating environment, the access request requesting access to data associated with a user of the operating environment;
   presenting a first temporal access option to the user, the first temporal access option defining a first access time period;
   receiving a selection of the first temporal access option from the user;
   granting to the application a temporal access right to access the data associated with the user for the first access time period associated with the first temporal access option;
   determining whether the first access time period is finite;
   responsive to determining that the first access time period is finite, determining whether the application has been inactive for a predetermined portion of the first access time period; and responsive to determining that the application has been inactive for the predetermined portion of the first access time period, revoking the temporal access rights granted to the application.

2. The computer-implemented method of claim 1, wherein the first temporal access options defines an access levels for accessing the data associated with the user of the operating environment.

3. The computer-implemented method of claim 1, further comprising:
   revoking the temporal access rights after an expiry of the first access time period.

4. The computer-implemented method of claim 3, further comprising:
   providing a reminder of temporal access rights expiration to the user prior to the expiry of the first access time period.

5. The computer-implemented method of claim 4, further comprising:
   receiving an extension request from the user in response to the reminder of temporal access rights expiration, the extension request requesting an extension of the first access time period.

6. The computer-implemented method of claim 5, further comprising:
   granting the extension of the first access time period to the application based upon the extension request from the user.

7. The computer-implemented method of claim 1, further comprising:
   prematurely revoking the first temporal access rights in response to a revocation request made by the user.

8. The computer-implemented method of claim 1, wherein determining whether the application has been inactive for the predetermined portion of the first access time period includes:
   determining whether the user fails to use the application for the predetermined portion of the first access time period.

9. The computer-implemented method of claim 1 wherein the operating environment is a social networking environment.

10. The computer-implemented method of claim 9 wherein the application is a gaming application that is configured to execute within the social networking environment.

11. A computing system including a processor and memory configured to perform operations comprising:
   receiving, on a computing device, an access request from an application executing within an operating environment, the access request requesting access to data associated with a user of the operating environment;
   presenting a first temporal access options to the user, the first temporal access options defining a first access time period;
   receiving a selection of the first temporal access option from the user;
   granting to the application a temporal access rights to access the data associated with the user for the first access time period associated with the first temporal access option;
   determining whether the first access time period is finite;
   responsive to determining that the first access time period is finite, determining whether the application has been inactive for a predetermined portion of the first access time period; and
   responsive to determining that the application has been inactive for the predetermined portion of the first access time period, revoking the temporal access rights granted to the application.

12. The computing system of claim 11, wherein the first temporal access options defines an access levels for accessing the data associated with the user of the operating environment.

13. The computing system of claim 11, further configured to perform operations comprising:
   revoking the temporal access rights after an expiry of the first access time period.

14. The computing system of claim 13, further configured to perform operations comprising:
   providing a reminder of temporal access rights expiration to the user prior to the expiry of the first access time period.

15. The computing system of claim 14, further configured to perform operations comprising:
   receiving an extension request from the user in response to the reminder of temporal access rights expiration, the extension request requesting an extension of the first access time period.

16. The computing system of claim 15, further configured to perform operations comprising:
   granting the extension of the first access time period to the application based upon the extension request from the user.

17. The computing system of claim 11, further configured to perform operations comprising:
   prematurely revoking the first temporal access rights in response to a revocation request made by the user.

18. The computing system of claim 11, wherein to determine whether the application has been inactive for the predetermined portion of the first access time period, the computing system is configured to perform operations comprising:
   determining whether the user fails to use the application for the predetermined portion of the first access time period.

19. The computing system of claim 11 wherein the operating environment is a social networking environment.

20. The computing system of claim 19 wherein the application is a gaming application that is configured to execute within the social networking environment.

\* \* \* \* \*

UNITED STATES PATENT AND TRADEMARK OFFICE
CERTIFICATE OF CORRECTION

| | |
|---|---|
| PATENT NO. | : 9,659,179 B1 |
| APPLICATION NO. | : 13/730404 |
| DATED | : May 23, 2017 |
| INVENTOR(S) | : Dan Fredinburg and Paulo Schlup Santos |

It is certified that error appears in the above-identified patent and that said Letters Patent is hereby corrected as shown below:

In the Claims

In Column 11, Line 54, please replace "options" with --option--

In Column 12, Line 1, please replace "rights" with --right--

In Column 12, Line 13, please replace "rights" with --right--

In Column 12, Line 16, please replace "options" with --option--

In Column 12, Line 21, please replace "rights" with --right--

In Column 12, Line 25, please replace "rights" with --right--

In Column 12, Line 31, please replace "rights" with --right--

In Column 12, Line 42, please replace "rights" with --right--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*